United States Patent

Ryvkin

[11] Patent Number: 5,910,651
[45] Date of Patent: Jun. 8, 1999

[54] METHOD AND APPARATUS FOR IMAGE NONLINEARITY COMPENSATION IN SCANNING SYSTEMS

[75] Inventor: Mark Ryvkin, South Windsor, Conn.

[73] Assignee: Gerber Systems Corporation, South Windsor, Conn.

[21] Appl. No.: 08/892,821

[22] Filed: Jul. 15, 1997

[51] Int. Cl.[6] .................................................. G06K 7/10
[52] U.S. Cl. ................................ 235/462.25; 235/462.28
[58] Field of Search ......................... 235/462.01, 462.06, 235/462.07, 462.1, 462.11, 462.12, 462.15, 462.25, 462.27, 462.28, 462.29, 472.01

[56] References Cited

U.S. PATENT DOCUMENTS

| | | | |
|---|---|---|---|
| 3,122,052 | 2/1964 | Buck | 88/16 |
| 3,555,254 | 1/1971 | Gerber | 235/151.11 |
| 3,651,256 | 3/1972 | Sherman et al. | 178/7.6 |
| 3,875,587 | 4/1975 | Pugsley | 358/80 |
| 3,984,747 | 10/1976 | Gerber et al. | 318/632 |
| 4,206,482 | 6/1980 | DeLavalette et al. | 358/290 |
| 4,260,997 | 4/1981 | Fukui | 346/108 |
| 4,293,864 | 10/1981 | Scott | 346/76 |
| 4,404,596 | 9/1983 | Juergensen et al. | 358/293 |
| 4,468,707 | 8/1984 | Kuehnle et al. | 358/300 |
| 4,475,787 | 10/1984 | Starkweather | 350/6.4 |
| 4,525,749 | 6/1985 | Maeda et al. | 358/285 |
| 4,538,181 | 8/1985 | Taylor | 358/208 |
| 4,568,984 | 2/1986 | Juergensen et al. | 358/293 |
| 4,595,957 | 6/1986 | Holthusen | 358/290 |
| 4,607,951 | 8/1986 | Seachman et al. | 355/51 |
| 4,637,710 | 1/1987 | Fujii et al. | 355/72 |
| 4,638,370 | 1/1987 | Rosier et al. | 358/293 |
| 4,801,810 | 1/1989 | Koso | 250/572 |
| 4,851,656 | 7/1989 | Straayer | 250/201 |
| 4,853,709 | 8/1989 | Stein et al. | 346/108 |
| 4,866,464 | 9/1989 | Straayer | 250/235 |
| 4,902,156 | 2/1990 | Deisler et al. | 403/24 |
| 5,115,328 | 5/1992 | Kadono | 358/474 |
| 5,164,843 | 11/1992 | Swanberg | 358/474 |
| 5,214,470 | 5/1993 | Denber | 355/75 |
| 5,278,674 | 1/1994 | Webb et al. | 358/475 |
| 5,291,392 | 3/1994 | Gerber et al. | 364/167.01 |
| 5,764,383 | 6/1998 | Saund et al. | 358/497 |

*Primary Examiner*—Thien Minh Le
*Attorney, Agent, or Firm*—McCormick, Paulding, & Huber

[57] ABSTRACT

A method and apparatus for use in improving the accuracy of scanning systems is disclosed and claimed. Systems such as internal drum photoplotters include a raster scanner responsive to control signals for advancing relative to a substrate an optical beam across a substrate surface in a first direction forming a scan line of pixels and for cooperatively advancing relative to the substrate the optical beam in a second direction substantially perpendicular to the first direction. The clock signal which is provided to a spinner to advance the optical beam across the scan line is independent from the pixel clock signal which is provided to control the generation of pixels. There is a memory for storing error compensation signals indicative of compensation needed to remove deviations of the separation between adjacent pixels in said scan line from preferred values thereof. The apparatus is characterized by a controller for generating control signals in dependence on the error compensation signals such that the phase of the clock signal is adjusted, thereby removing the pixel separation error for a segment of the scan line.

24 Claims, 4 Drawing Sheets

METHOD AND APPARATUS FOR IMAGE NONLINEARITY COMPENSATION IN SCANNING SYSTEMS

TECHNICAL FIELD

The present invention relates to scanning systems in general and, more particularly, to scanning systems in having error compensation for improved scan accuracy.

BACKGROUND OF THE INVENTION

Raster scan photoplotters of both planar and internal drum design are used in the fabrication of printed circuit boards. Planar photoplotters or imagers such as are disclosed and claimed in U.S. Pat. No. 4,851,656 and incorporated herein by reference have a planar surface for receiving a substrate. An optical exposure head is located on a movable gantry apparatus and is rastered above the substrate during exposure. Internal drum photoplotters have a cylindrical surface portion to receive the substrate. The exposure beam emanates from an optical exposure head and is scanned across the substrate. The optical exposure head is indexed along the longitudinal axis of the cylinder to complete the substrate exposure.

Similarly, optical scanners receive light from a surface which contains an image that is to be converted to an electronic equivalent. In most scanners, a document and/or artwork is placed on a surface and illuminated. Light containing the image is gathered by an electronic photosensor that is typically rastered about the surface. Both the photoplotter and the scanner are examples of scanning systems generally.

Internal drum raster photoplotters have inherent advantages over planar type scanners for several reasons, including simplicity of design and lower costs. However, both are subject to component tolerances which result in lower accuracy than would otherwise be possible. The drum surface is fabricated with inherent deviations from perfect cylindricity. Planar photoplotters or flatbed scanners are similarly afflicted by surface irregularities. These deviations result, in part, in scan lines on the substrate of varying length.

A compensation technique adaptable for use with a planar photoplotter or scanner is found in U.S. Pat. No. 3,555,254, incorporated herein by reference. Disclosed therein is a system for positioning a driven part in a numerically controlled positioning device. In the setting up of the system, the driven part is commanded to move to various positions spread over its field of movement and after it reaches each such position, its actual position is accurately measured to determine the error between the commanded position and the actual position. The values of the errors thus determined are stored in computer memory as a table of error values versus part position. Thereafter, as the driven part is moved to different positions relative to the reference member, the computer memory is interrogated and error values from the table are used to correct the commands transmitted to the motor drivers to take into account the repeatable error associated with the position of the driven part. The '254 system further includes an input device for providing position input commands, one or more motors for driving the driven part, and a computer for converting the input commands into corrected output commands.

In the prior art, internal drum raster photoplotters have been built with components defect compensation. For example, MDA of Vancouver, BC markets an internal laser raster drum photoplotter with compensation. First, the deviations from true cylindricity are determined as a function of position on the cylinder portion surface. The commanded raster pattern is thereafter shifted by incremental pixels at the photoplotting resolution (i.e. 0.25 mil). Pixels are dropped from the image and other pixels are duplicated as needed. These commanded shifts have the unfortunate effect, however, of distorting the image and introducing abrupt shifts of 0.25 mil in the photoplot. For example, if a shift were to occur exactly on a circuit trace, it would distort the width of this trace by the 0.25 mil error, which can be detrimental to the performance of the circuit.

Another example of a known scanning system having compensation is disclosed and claimed in U.S. Pat. No. 5,291,392 which patent is incorporated herein by reference. The '392 method is characterized by method of providing compensation for inaccuracies in a scanning optical system that has a platen for receiving a substrate and a scanning means responsive to a clock signal for advancing relative to said substrate an optical beam across the substrate surface forming a series of pixels that constitute a scan line.

The '392 method includes the steps of generating command signal values for registration marks positioned about a substrate surface, exposing a calibration substrate to an optical beam so as to image said registration marks therein and generating signals indicative of the measured position of said registration marks in said substrate surface. The method also includes the steps of comparing the measured registration mark position signal values with the command position signal values to generate error signals corresponding to deviations of the measured registration mark positions from the command signal value positions and generating control signals to adjust the phase of a clock signal in dependence on the error signal magnitude, thereby removing the deviations from a scan line segment of the scan line.

The '392 system is limited in the sense that the preferred embodiment disclosed therein incorporates a tapped delay line for generating a plurality of clock signals each at a different phase relative to one another. There is no variability in the phase separation since the delay and number of taps are fixed. Compensation based on a delay line is, therefore, limited to systems with low spinner speeds. It would be advantageous to have a system for providing compensation for nonlinearities in scanning systems which avoid abrupt shifts in the written substrate and which are not limited to a single speed or, in systems with curved platens, a single diameter. The present invention is drawn toward such a system.

SUMMARY OF THE INVENTION

An object of the present invention is to provide a scanning system for use with a scanning system that compensates for inaccuracies in system componentry.

Another object of the invention is to provide a system for use in a photoplotter or scanner of the forgoing type that determines errors in actual beam position on a substrate from a commanded position and adjusts the phase of a pixel scan signal to eliminate the error for a given scan line segment.

Still another aspect of the present invention is to provide a system of the foregoing type that compensates for drum cylindricity errors in systems with curved substrate platens as well as noncocentricty of spinner to drum axis.

Yet another aspect of the present invention is to provide a system of the foregoing type that compensates for slow axis nonlinearity by adjusting the position of the start of scan.

Another aspect of the present invention is to provide a system of the foregoing type that compensates for differences in media thickness and errors due to temperature variations.

Still another aspect of the present invention is to provide a system of the foregoing type that allows the application of a magnification factor for a selected scan line independent from that of other scan lines along the slow scan direction.

According to the present invention, an apparatus for providing compensation for inaccuracies in a scanning optical system that has a platen for receiving a substrate having a surface and a raster scanning means responsive to control signals, having a mirror for advancing relative to the substrate an optical beam across the substrate surface in a first direction forming a scan line that includes a linear array of pixels formed by optically modulating the optical beam includes a signal generator means for generating a master clock signal, a pixel clock signal generator for receiving the master clock signal and for providing a pixel clock signal in response to pixel control signals for governing the separation between adjacent pixels in the scan line. There is a mirror clock signal generator for receiving the master clock signal independently of the pixel clock signal generator and for providing a mirror clock signal in response to mirror control signals for governing the rotational speed of the mirror, thereby determining the advancement of said optical beam in the first direction. A memory is provided for storing error compensation signals indicative of compensation needed to remove deviations of the separation between adjacent pixels in said scan line from preferred values thereof. A controller generates the pixel and mirror control signals in dependence on said error compensation signals such that the phase of the pixel clock signal is adjusted relative to the phase of the mirror clock signal, thereby removing the deviations for a segment of the scan line.

DESCRIPTION OF THE PREFERRED EMBODIMENT

Figure 1:
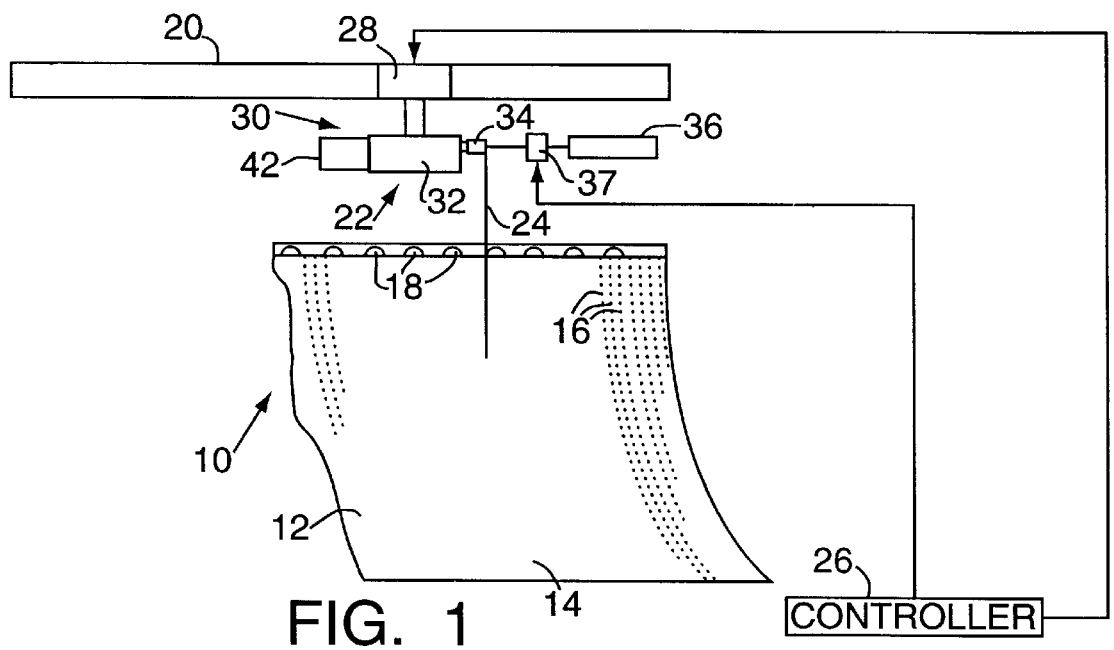
FIG. 1 is a simplified schematic illustration of a portion of an internal drum raster photoplotter providing accuracy compensation.

Referring now to FIG. 1 there is shown a simplified schematic illustration of a scanning system provided in accordance with the present invention. The illustrative scanning system is an internal drum raster photoplotter 10 having an internal drum 12 with a surface 14 that comprises a portion of a cylinder. The internal drum is carefully fabricated and must maintain the cylindricity of the surface 14 with great accuracy regardless of variations in environmental parameters such as temperature. To that end the internal drum is a substantial structure preferably of cast aluminum with a series of reinforcing ribs (not shown) spaced along an outside perimeter.

Figure 3:
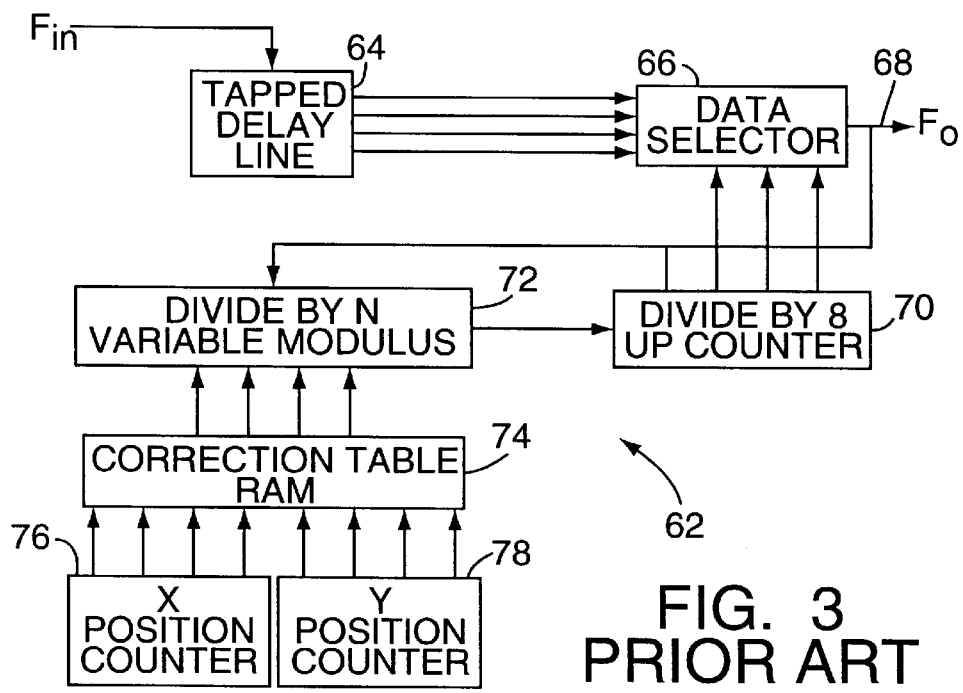
FIG. 3 is an illustration of a portion of compensation circuitry found in the prior art.

The surface 14 is adapted to receive a substrate and includes a plurality of holes 16 which communicate with a plurality of internal channels 18 through which a vacuum is generated by conventional apparatus not shown in the drawing. As shown in FIG. 3, the vacuum is used to hold a substrate 21 in place during the exposure process. Alternative methods can be equivalently used to hold the substrate in place, including electrostatic and mechanical retention techniques.

The photoplotter also includes a rail 20 that has a carriage mounted raster scanner 22 for scanning an optical beam 24 about the substrate surface in response to command signals received from controller 26 in a manner detailed hereinafter. The raster scanner includes a linear encoder 28 for generating signals indicative of the position of the raster scanner as it moves along the rail. Also included is a fast scan apparatus 30 preferably comprised of a motor 32 and mirror 34 for receiving the optical beam at a mirror surface 35 from an optical beam source, such as laser 36, and for exposing a series of scan lines 38 on the substrate by rotating the mirror about a spin axis 40, typically at 12,000 rpm. A rotary encoder 42 is included for generating signals indicative of the angular position of the mirror surface during a scan. The mirror surface is preferably fabricated to have an off axis parabolic curvature so that small deviations in the position of the optical beam from the longitudinal axis do not yield significant excursions of the optical beam from the preferred scan line. An alternative mirror is a 45° turning mirror.

Internal drum scanning optical systems such as scanners operating as data transmitters or imagers operating as data receivers face major challenges regarding their ability to achieve accuracy in their scanner function. Cylindrical scanning systems benefit greatly from their simplicity, but accuracy must be maintained. There are three axes whose alignment directly affects accuracy in a system as described with respect to the preferred embodiment. These are the axis of the cylinder, that of the rotating mirror and the axis of the optical beam. All three should be aligned relative to one another for maximum accuracy.

With a conventional plane mirror, misalignment of the optical beam and cylinder axes produces an out of squareness error. That is; the scan lines are not exactly perpendicular to the cylinder axis. Relative misalignment can be compensated by employing an off axis parabolic mirror. The off axis parabolic mirror has a fixed focus which spins around the drum and is unaffected by misalignment between the optical beam and mirror axes.

As is conventional with systems of the present type, movement of the raster scanner along the rail defines a slow scan direction, while a scan line along which the beam is projected defines a long or fast scan direction. Those skilled in the art will note that each scan line is comprised of a series of (ideally) evenly spaced pixels whose separation is given by the system parameters, including the rotational speed of the mirror.

In photoplotter applications, the system typically includes an optical modulator 37 of a known type which periodically modulates the presentation of the optical beam to the substrate surface in response to modulation signals from the controller, and thereby create the array of pixels which form the scan line. For imaging applications, the system can include apparatus for periodic illumination at the desired pixel location, an optic train which limits the acquisition of light to a given area, data sampling electronics for data acquisition only at selected times or a combination of the foregoing.

A significant challenge in the fabrication of an optical system such as the present photoplotter is the achievement of accuracy. This is primarily a result of the requirement for extreme precision between the mirror spin axis and the cylindrical drum surface. A radial error as small as 0.3 mil produces a 1.0 mil accuracy error in a cylinder. Radial error in the present context is defined to include a variation in distance from the mirror surface to the substrate surface. This radial error is introduced primarily by deviations from an ideal curved surface. This error translates into a lengthening or shortening in the distance between pixels. However, by compensation provided in accordance with the present invention, a +5.0 mil radial run out can yield an accuracy better than 1.0 mil.

One procedure for determining the magnitude of the errors in drum surface is disclosed and claimed in U.S. Pat. No. 4,867,566 and incorporated herein by reference. In the '566 process, a compensation plot consisting of a regular grid of lines with a fixed spacing is first generated. It is desirable that this compensation plot be produced on mechanically stable media. However, the '566 process can be used to further compensate for unstable media such as a printed circuit (PC) film substrate.

The grid spacing (and compensation frequency) for the compensation plot is selected to be less than the maximum rate change of machine error. The measured values are compared with values corresponding to a defect free drum surface, resulting in an error table in both X and Y directions for each grid intersection. This error table is then used, through an appropriate transformation, to create a compensation table which is loaded into memory associated with the controller.

Compensation as taught in the '392 patent is, in sum, achieved by an adjustment in the scan angle of the spinning mirror (either advance or retard) for each pixel. This is done by the '392 system by phase shifting a reference clock signal which controls pixel placement as detailed hereinbelow. A photoplot of this same grid is made with active correction. This plot is again measured and the correction is verified. This process can be repeated recursively. The techniques and processes for generating compensation values taught in the '392 patent are directly applicable to the present invention.

For internal drum scanning systems the long scan (or fast scan) accuracy is solely dependent on the radius of scan.. In the internal drum this is the scanner axis to the inside diameter/emulsion distance. It is well known, however, that small radial errors can cause substantial accuracy errors due to the large sweep angle. For a half cylinder:

$$E = \pi \Delta R$$

where E corresponds to the error in length accuracy and R is the error in radius. As noted above, only a 0.3 mil radius error will produce a 1.0 mil accuracy error. By contrast, an internal drum raster photoplotter incorporating the present invention produces only a 0.06 mil shift.

Referring now to FIG. 3, there is shown a portion of a known compensation circuit 62 disclosed and claimed in U.S. Pat. No. 5,291,392. The circuit 62 utilizes a tapped delay line 64 selected such that each tap is ⅛ of the master clock signal period. An 8 to 1 data selector 66 allows each delay line tap to be selected as the output clock signal on line 68. This selector is connected to a divide by 8 counter 70 which, when clocked, will advance or retard the output clock signal phase by 45°. This counter is controlled by a divide by N counter 72, where N is determined by the present input. The frequency of the output clock signal is determined by the following equation:

$$f_{out} = \frac{8N * f_{in}}{8N + 1}$$

This equation is for retarding the phase, therefore resulting in a lower frequency than the input signal.

A correction, or mapping table RAM 74, is used to provide N correction signals to the variable modulus counter. The address signals input to the RAM are received from X and Y position counters 76, 78. This allows for a grid of correction areas, each about ½ inch square. A compensation value for each area is uniquely addressed as the image progress. The correction RAM is dual ported so that it may be loaded from a central processor unit (CPU) associated with the controller. This RAM is nonvolatile so that only when compensation is changed will its contents have to be updated.

In the compensation circuit of FIG. 3, N corresponds to the number of output pulses ($F_0$) which are skipped before a signal is generated by the divide by N variable modulus counter. That signal is then presented to the divide by 8 up-counter which then causes the data selector to "bump" and select the next phased signal from the tapped delay line to be presented as the output signal ($F_0$).

Figure 4:
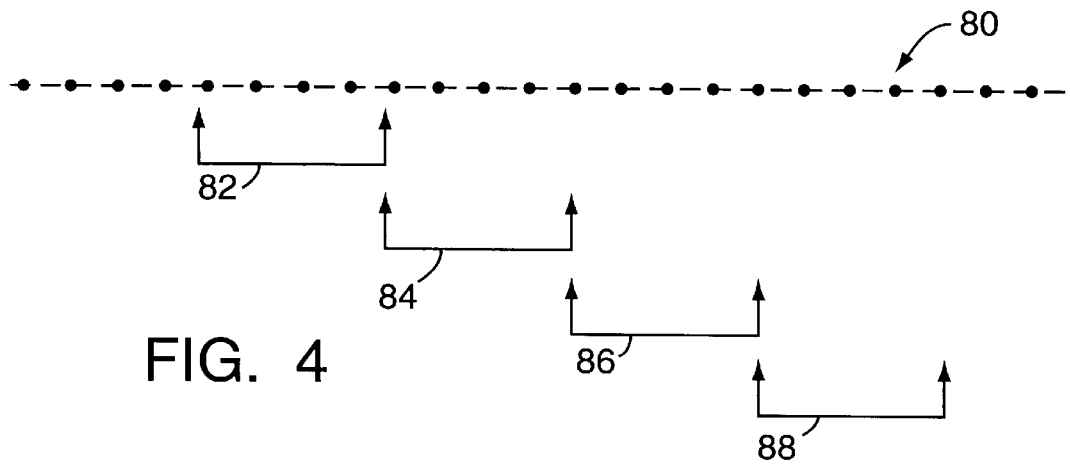
FIG. 4 is a diagrammatic illustration of several consecutive groups of pixels in a scan line.

Shown diagrammatically in FIG. 4 is a scan line 80 comprised of pixels configured in a sequence of groups 82–88 of approximately equal size. As an example with the '392 compensation circuit, assume there are 4,000 pixels per group and N has a range of 0 to 255. Then, if N=200 for a given group of pixels, the next signal on the tapped delay line would be selected as the output signal at every 200th pixel. Thereafter, N could be 212 for the second group 84 and 180 for the third group 86 so that the spacing between pixels can be adjusted and the error removed.

The '392 compensation circuit employs a tapped delay line to generate a fixed number of phases which can be then selected for the output signal out of frequency $F_0$. As the number of pixels per inch increases from application to application, the compensation circuit of FIG. 3 becomes more undesirable. Neither the resolution or nor the accuracy of a tapped delay line are acceptable for high dot per inch (dpi) applications. Moreover, changes in spinner speed are not readily accommodated by the compensation circuit of FIG. 3.

Figure 2:
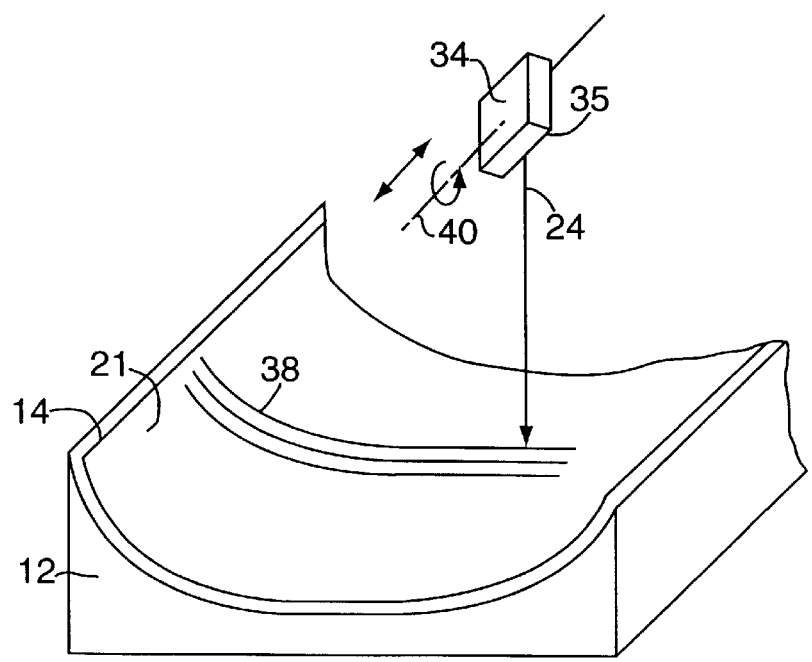
FIG. 2 is a simplified illustration showing the scanning of an optical beam across a portion of a substrate surface by the photoplotter of FIG. 1.
Figure 5:
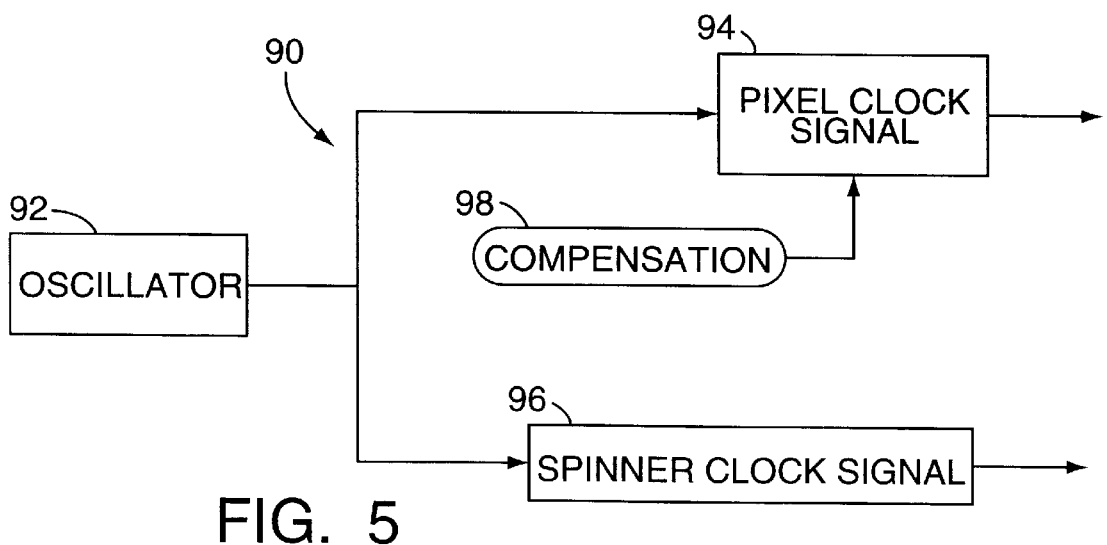
FIG. 5 is a simplified schematic illustration of a portion of a controller for use with an internal drum raster scanner providing accuracy compensation in accordance with the present invention.

Referring now to FIG. 5, there is shown in simplified schematic form a compensated scanning system controller 90 providing in accordance with the present invention. The present scanning system controller is used with compensated scanning system whose components are substantially as described hereinabove with respect to FIGS. 1 and 2.

The scanning system controller 90 includes an oscillator 92 for providing a master clock signal at one or more selected frequencies. The oscillator signal is independently provided to both a pixel clock signal generator 94 and a spinner clock signal generator 96. There is also compensation apparatus 98 which provides output signals to the pixel clock signal generator to selectively halt the presentation of a pixel clock signal in dependence on error correction signals, thereby effectively varying the phase of the pixel clock signal relative to the spinner clock signal.

Those skilled in the art will note that the foregoing feature marks an important point of departure of the present invention of the prior art. Unlike prior scanning systems in which the input signal $F_{in}$ is proportional to an encoder clock signal that drives the spinner, the present invention has no phase lock loop feature; it is operated in basically an open loop manner. The clock signal which is provided to the spinner is independent from that which is provided to the pixel clock signal generator.

Figure 6:
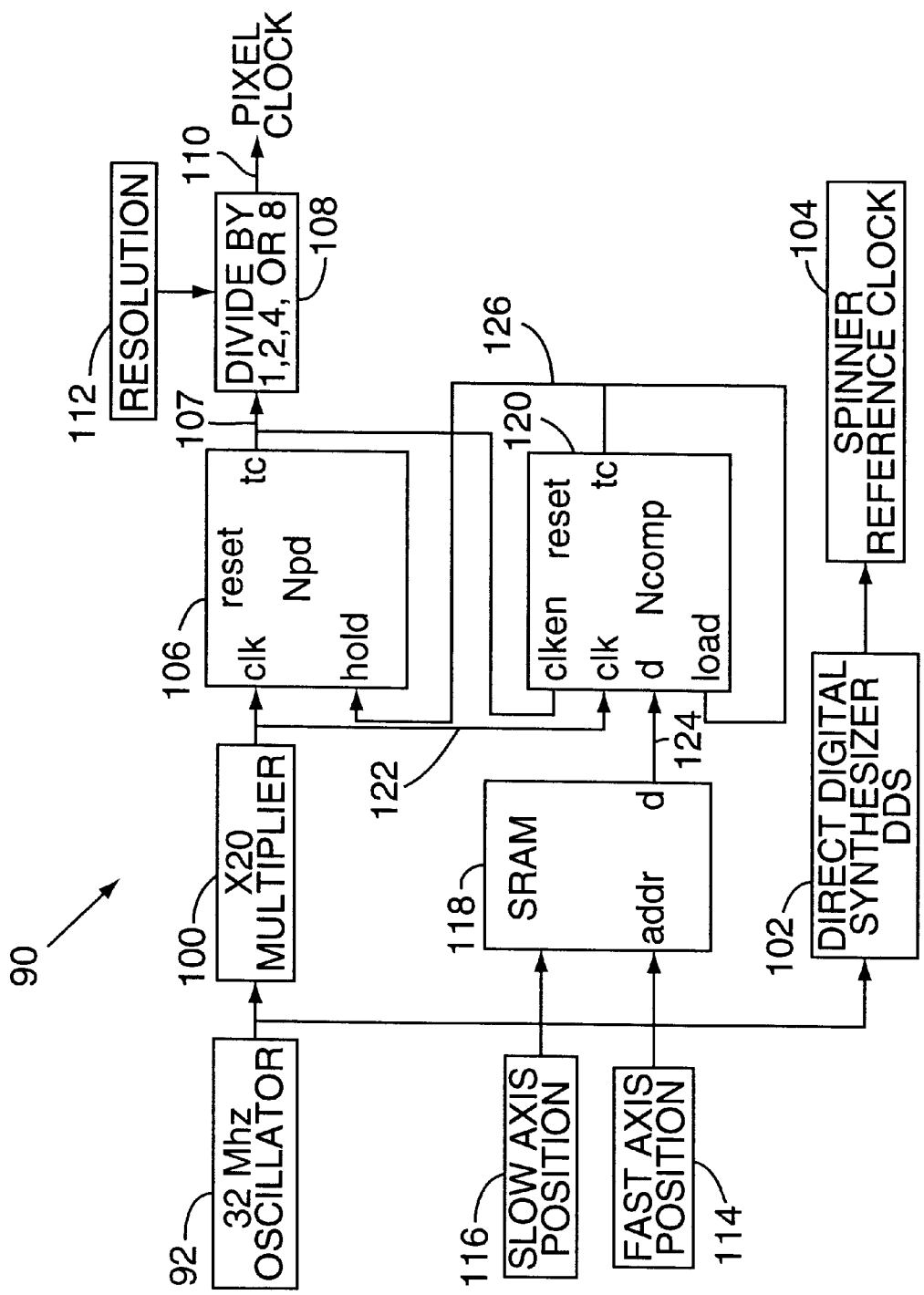
FIG. 6 is a simplified schematic illustration of compensation apparatus provided according to the present invention.

A more detailed view of the preferred embodiment of a scanning system controller provided in accordance with the present invention is described with respect to FIG. 6. The scanner system controller 90 includes the oscillator operating at a frequency of 32 Mhz which independently presents signals on lines to both a times 20 (20×) multiplier 100 as well as a direct digital synthesizer 102. The output signals from the direct digital synthesizer are provided to the spinner (mirror) indicated at block 104 to be the clock signal for the operation of that portion of the scanning system.

The multiplier will, in the preferred embodiment, generate a 640 Mhz output signal for presentation to a N prescaler/divider (Npd) 106. The initial pixel clock signal is selected to be slightly higher than the nominal clock signal for compensation to occur. The prescaler/divider provides its output signal on line 107 to a divider 108 having a selectable divisor magnitude, either 1, 2, 4 or 8 in the preferred embodiment before presenting the pixel clock signal on line 110. The resolution of the present system is adjusted by the divider 108 upon receipt of resolution signals indicated schematically at block 112. If the Npd output signal is divided by 1, the selected resolution in the preferred embodiment would be 8,000 dots per inch, whereas if the Npd output signal is divided by 8, the clock signal would be appropriate for a lower resolution application of approximately 1,000 dpi.

In the preferred embodiment, compensation signals are stored in an X-position (fast scan axis) counter 114 and a Y-position (slow scan axis) counter 116 each having correction values corresponding to a position on the drum surface. Each compensation table is stored in a medium speed, 128K by 8 SRAM 118. In the preferred embodiment, the upper 64 kb of the SRAM are not used. The lower 64 k portion of each SRAM is available for a controller central processor unit (CPU) access as a 16 bit address port in bidirectional 8 bit data port. In the embodiment shown, the CPU loads the compensation table on the system power-up. The 16 kb compensation table is addressed while imaging by the fast axis and slow axis position counters.

With the present system, there is an integer compensation signal generator (Ncomp) 120 which corresponds to a divide by N counter. The divide by N counter receives the multiplied clock signal On line 122 as well as the fast and slow scan position compensation signals from the SRAM on line 124. The divide by N counter generates a hold signal on line 126 for presentation to the prescaler divider to basically cause the prescaler divider to "skip a pulse". In other words, the prescaler divider will, upon receipt of a hold signal from the divide by N counter, simply not output a pixel clock signal on line 107. The number of pixels per inch can then be adjusted directly by the number of times that the hold signal is presented to the divide by N counter. This instruction signal is provided in accordance with the signals received from the SRAM.

In sum, the present system as outlined herein operates in accordance with the following equation:

$$F_{out} = [Ncomp/(Npd \times Ncomp) + 1] \times F_{in}$$

where $F_{out}$ is compensated pixel clock signal, $F_{in}$ is an input signal whose frequency is greater than a nominal pixel clock signal (Fpclk), Npd is a post divider with divisor values of 2, 3 or 4. Ncomp is an integer compensation value provided during calibration.

In accordance with the present invention, a fraction of a cycle can be added to the pixel clock signal at predetermined intervals to provide compensation. Consequently, the present invention avoids the limitations of the tapped delay line, since there are now more than a finite, evenly spaced number of clock signals from which to chose and thereby create the compensated pixel clock signal.

As noted above, a key feature of the present invention is the independent generation of the spinner clock reference signal from that of the pixel clock signal. This is accomplished at the present invention with a minimum of modifications to preexisting control system elements and allows for the present controller to be optimized for the different speeds, drum diameters, pixel densities that are found in a variety of scanning systems. For example, the system in the preferred embodiment will readily operate at 8 times higher speed than the input clock signal ($F_{in}$) that is used by the '392 apparatus.

In the preferred embodiment, the fast scan axis address always increments from zero (A0) for every scan. The A0 address represents a distance of 4 rotary encoder clock signals and is 0.252" for a nominal drum radius or 1.44 degrees for any drum regardless of radius. The rotary encoder provides an index signal that, in the embodiment shown, is approximately 5° above the drum edge. The index signal from the rotary encoder corresponds to the ideal beginning of a scan line. The present system delays the start of the current scan line to allow an adjustment to evenly position the start of each scan line. The fast axis position address starts right at the index signal where the actual start of a scan line is delayed by some small amount, which in the present embodiment is a distance of approximately 1.0" to evenly position the beginning of a scan line in the slow scan direction.

Slow scan axis compensation is possible as well with the present system. The present system increments from scan line to scan line along the slow scan axis substantially as detailed herein for the fast scan axis. The position of the scan lines in the slow scan direction is governed by the output signals from the linear encoder including a periodic reference signal. The present compensation apparatus does not compensate for every reference signal generated by the linear encoder, rather a select number of signal pulses are skipped to allow for proper spacing of scan lines.

Figure 7:
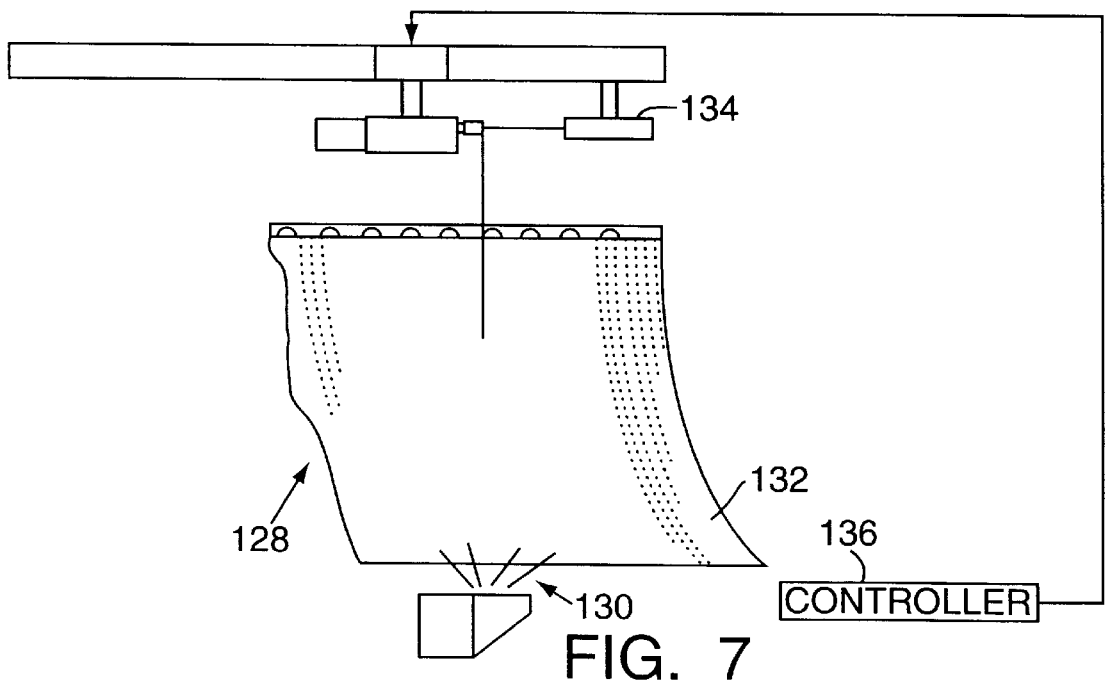
FIG. 7 is a diagrammatic illustration of an a scanner utilizing compensation apparatus provided by the present invention.

The present invention also encompasses a scanning system having a curved internal drum but used as a scanner (reader) rather than an imager. As shown in FIG. 7, a scanner 128 is substantially the same as the photoplotter detailed hereinabove, but it reads two dimensional pixel data from a substrate rather than recording from the same. Such a scanner is used to transmit data (e.g., for facsimile), to capture it for manipulation (e.g., reverse engineering), or for inspection (e.g., AOI). The scanner 128 functions by illuminating the test sample with an unmodulated beam 130 of scanned light (e.g., CW) capturing the reflected or transmitted light after it leaves substrate 132. This transmitted or reflected signals are received by detector 134 and then digitized at 1 or more bits per pixel by controller 136. The operation of scanner 128 by the controller 136 is otherwise as described above. Planar substrates may also be inspected in accordance with a variety of the above referenced automatic optical inspection techniques (AOI) such as are disclosed in U.S. Pat. Nos. 4,500,202; 4,518,810; 4,668,982 and 4,776,022 and incorporated herein by reference.

The method used to increase the accuracy of the scanner of FIG. 7 is highly similar to that used for the recorder as disclosed in the '392 patent. In the scanner's case however, a calibration grid plot is placed in the internal drum and then scanned. This plot has either a high accuracy or has been calibrated and its errors tabulated. The scanned data is then compared with the known error data and a new error table is generated which is specific to this scanner. This error table is then entered into the scanner controller as compensation data. With the compensation system active, the grid plot is re-scanned. This result is compared with the accuracy data for this grid plot.

Those skilled in the art will note that the present invention can be used in eliminating inaccuracies in scanning systems regardless of the platen surface configuration (flat or curved) or whether the scanning system is an imager or a digitizer. Also, the present invention can be used to measure the existing artwork from other scanning systems by generating an error table based on a comparison between the command signals used, as an example, to generate a plot of interest as compared to the measured location of its pixels. Consequently the compensation apparatus can be used to alter the existing error table for a given system so as to "distort" the pixel generation process to yield a plot that matches existing artwork. The present compensation apparatus can also be retrofitted to existing scanning systems to compensate for that particular system's inaccuracies using, for example, the procedures of the '392 patent.

Similarly, although the invention has been shown and described with respect to a preferred embodiment thereof, it would be understood by those skilled in the art that other various changes, omissions and additions thereto may be made without departing from the spirit and scope of the present invention.

I claim:

1. An apparatus for providing compensation for inaccuracies in a scanning optical system that has a platen for receiving a substrate having a surface and a raster scanning means responsive to control signals, having a mirror for advancing relative to said substrate an optical beam across said substrate surface in a first direction forming a scan line that includes a linear array of pixels formed by optically modulating the optical beam, said apparatus comprising:

a signal generator means for generating a master clock signal;

a pixel clock signal generator for receiving said master clock signal and for providing a pixel clock signal in response to pixel control signals for governing the separation between adjacent pixels in said scan line;

a mirror clock signal generator for receiving said master clock signal independently of said pixel clock signal generator, and for providing a mirror clock signal in response to mirror control signals for governing the rotational speed of the mirror, thereby determining the advancement of said optical beam in said first direction;

a memory means for storing error compensation signals indicative of compensation needed to remove deviations of the separation between adjacent pixels in said scan line from preferred values thereof; and a controller for generating said pixel and mirror control signals in dependence on said error compensation signals such that the phase of said pixel clock signal is adjusted relative to the phase of said mirror clock signal, thereby removing said deviations for a segment of said scan line.

2. The apparatus of claim 1 wherein said platen comprises an internal drum of a raster photoplotter.

3. The apparatus of claim 2 further comprising a means for generating said optical beam.

4. The apparatus of claim 2 further comprising a means for cooperatively advancing relative to said substrate said optical beam in a second direction substantially perpendicular to said first direction and a linear encoder means for generating signals indicative of a current position of said raster scanning means along a drum longitudinal axis.

5. The apparatus of claim 2 further comprising a rotary encoder means for generating signals indicative of a current position of said optical beam along said scan line.

6. The apparatus of claim 2 wherein said raster scanning means comprises a mirror configured to move substantially along a internal drum longitudinal axis for providing said optical beam to said substrate within an included angle, thereby exposing a scan line.

7. The apparatus of claim 6 wherein said mirror is a 45° turning mirror.

8. The apparatus of claim 6 wherein said mirror has a curved reflective surface that comprises a portion of an off axis parabola.

9. The apparatus of claim 1 wherein said controller further comprises an oscillator and wherein said pixel clock signal generator further comprises a N prescaler/divider (Npd) means that directly receives an oscillator signal and outputs a pulsed pixel clock signal and an integer compensation signal generator (Ncomp) which provides a hold signal to said N prescaler/divider means to skip the next pulse in said pulsed pixel clock signal and wherein said mirror clock signal generator further directly receives said oscillator signal and comprises a direct digital synthesizer for presenting a digital clock signal to control the rotation of said mirror.

10. The apparatus of claim 9 wherein said pixel clock signal generator further comprises a multiplier means for receiving said oscillator signals and generating therefrom a signal whose frequency is an integer multiple of the frequency of said oscillator signal.

11. The apparatus of claim 9 wherein said pixel clock signal generator further comprises a divider means for receiving said pulsed pixel clock signal and generates therefrom a pixel clock signal whose frequency is an integer fraction of the frequency of said pulsed pixel clock signal.

12. The apparatus of claim 9 wherein said memory means further comprises an SRAM.

13. An optical photoplotter comprising:

an optical source for generating an exposure beam;

a platen for receiving a substrate;

a raster scanning means responsive to control signals, having a mirror for advancing relative to said substrate an optical beam across a substrate surface in a first direction forming a scan line that includes a linear array of pixels and for cooperatively advancing relative to said substrate surface said optical beam in a second direction substantially perpendicular to said first direction, said raster scanning means also including a means for providing optical modulation to said exposure beam, thereby forming said pixels;

a signal generator means for generating a master clock signal;

a pixel clock signal generator for receiving said master clock signal and for providing a pixel clock signal in response to pixel control signals for governing the separation between adjacent pixels in said scan line;

a mirror clock signal generator for receiving said master clock signal independently of said pixel clock signal generator, and for providing a mirror clock signal in response to mirror control signals for governing the rotational speed of the mirror, thereby determining the advancement of said optical beam in said first direction;

a memory means for storing error compensation signals indicative of compensation needed to remove deviations of the separation between adjacent pixels in said scan line from preferred values thereof; and a controller for generating said pixel and mirror control signals in dependence on said error signals such that the phase of said pixel clock signal is adjusted relative to the phase of said mirror clock signal, thereby removing said deviations for a segment of said scan line.

14. The optical photoplotter of claim 13 further comprising a linear encoder means for generating signals indicative of a current position of said raster scanning means along a longitudinal axis.

15. The optical photoplotter of claim 13 further comprising a rotary encoder means for generating signals indicative of a current position of said optical beam along said scan line.

16. The optical photoplotter of claim 13 wherein platen surface is curved and said raster scanning means comprises a mirror configured to move substantially along a longitudinal axis for providing said optical beam to said substrate within an included angle, thereby exposing a scan line.

17. The optical photoplotter of claim 16 wherein said mirror is a 45° turning mirror.

18. The optical photoplotter of claim 16 wherein said mirror has a curved reflective surface that comprises a portion of an off axis parabola.

19. A method for providing compensation for inaccuracies in a scanning optical system that has a platen for receiving a substrate having a surface and a raster scanning means responsive to control signals, having a mirror for advancing relative to said substrate an optical beam across said substrate surface in a first direction forming a scan line that includes a linear array of pixels formed by optically modulating the optical beam, said method comprising the steps of:

generating a master clock signal;

providing a pixel clock signal in response to pixel control signals for governing the separation between adjacent pixels in said scan line and said master clock signal;

providing a mirror clock signal in response to mirror control signals for governing the rotational speed of the mirror, and said master clock signal received independently of said pixel clock signal generator, thereby determining the advancement of said optical beam in said first direction;

storing error compensation signals indicative of compensation needed to remove deviations of the separation between adjacent pixels in said scan line from preferred values thereof; and generating said pixel and mirror control signals in dependence on said error compensation signals such that the phase of said pixel clock signal is adjusted relative to the phase of said mirror clock signal, thereby removing said deviations for a segment of said scan line.

20. The apparatus of claim 1 wherein said platen comprises a planar surface of a raster photoplotter.

21. The apparatus of claim 1 wherein said scanning optical system further comprises a means for receiving said optical beam from said scan line segment and for generating therefrom electrical signal equivalents indicative of intensity variations of said optical beam.

22. The apparatus of claim 21 further comprising a means for illuminating said scan line segment, thereby generating said optical beam.

23. The apparatus of claim 5 wherein said rotary encoder provides an index signal that corresponds to the ideal beginning of a scan line and where said apparatus further comprises a means for delaying the start of the current scan line and adjusts said scan line start relative to a previous scan line start to be equal as compared to an adjacent substrate edge.

24. The apparatus of claim 23 wherein the actual start of a scan line is delayed by approximately 1.0" to evenly position the beginning of each scan line in the slow scan direction.

* * * * *